United States Patent
Touma et al.

(10) Patent No.: US 10,712,566 B2
(45) Date of Patent: Jul. 14, 2020

(54) INFORMATION DISPLAYING SYSTEM PROVIDED WITH HEAD-MOUNTED TYPE DISPLAY

(71) Applicant: DENSO WAVE INCORPORATED, Chita-gun, Aichi-pref. (JP)

(72) Inventors: Hirota Touma, Chita-gun (JP); Yoshihiro Miyakoshi, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/362,123

(22) Filed: Nov. 28, 2016

(65) Prior Publication Data

US 2017/0206710 A1   Jul. 20, 2017

(30) Foreign Application Priority Data

Nov. 26, 2015  (JP) ................................ 2015-230572
Dec. 1, 2015   (JP) ................................ 2015-234680

(51) Int. Cl.
G06F 3/01      (2006.01)
G02B 27/01     (2006.01)
G09G 3/20      (2006.01)
G06F 3/0481    (2013.01)

(52) U.S. Cl.
CPC ......... *G02B 27/0172* (2013.01); *G06F 3/012* (2013.01); *G06F 3/0481* (2013.01); *G09G 3/2092* (2013.01); *G02B 2027/014* (2013.01); *G02B 2027/0141* (2013.01); *G02B 2027/0178* (2013.01)

(58) Field of Classification Search
None
See application file for complete search history.

(56) References Cited

U.S. PATENT DOCUMENTS

| 2004/0041822 | A1* | 3/2004 | Iizuka ................... G06T 15/005 345/634 |
|---|---|---|---|
| 2011/0311127 | A1 | 12/2011 | Mizutani et al. |
| 2013/0009863 | A1 | 1/2013 | Noda |
| 2014/0198033 | A1 | 7/2014 | Kobayashi |
| 2014/0240484 | A1 | 8/2014 | Kodama et al. |
| 2016/0140907 | A1 | 5/2016 | Kohtoku |

(Continued)

FOREIGN PATENT DOCUMENTS

| JP | 2005-339127 A | 12/2005 |
|---|---|---|
| JP | 2010-231713 A | 10/2010 |

(Continued)

*Primary Examiner* — Yanna Wu
(74) *Attorney, Agent, or Firm* — Oliff PLC

(57) ABSTRACT

A system and method are provided for acquiring a respective position of a robot arm and a facility, and three-dimensional shape information according to a controller, and for acquiring a position of a worker and eye-gaze direction information acquired through a sensor unit. Furthermore, the controller is provided for calculating a display form of the facility coming into a view of the worker through a display unit of smart glasses on the basis of the aforementioned information. When information of the display form and operation information of the facility are acquired, a portion of the facility coming into the worker is set as a display prohibition region on the display unit and the operation information is displayed in a region excluding the display prohibition region.

14 Claims, 16 Drawing Sheets

(56) References Cited

U.S. PATENT DOCUMENTS

2016/0267887 A1     9/2016  Noda
2016/0288318 A1*  10/2016  Nakazato ............... B25J 9/1666
2017/0123491 A1*   5/2017  Hansen .................. G06F 3/013

FOREIGN PATENT DOCUMENTS

| JP | 2010-234959 A | 10/2010 |
| JP | 2012-218120 A | 11/2012 |
| JP | 2014-095903 A |  5/2014 |

* cited by examiner

FIG.9
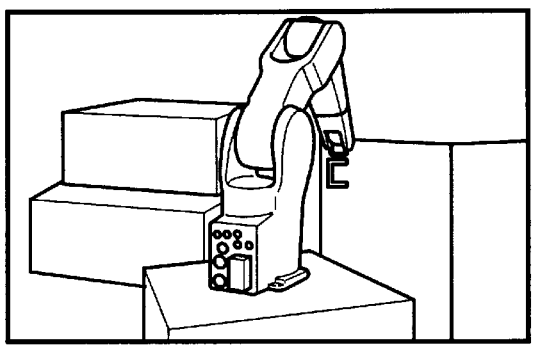
(a)
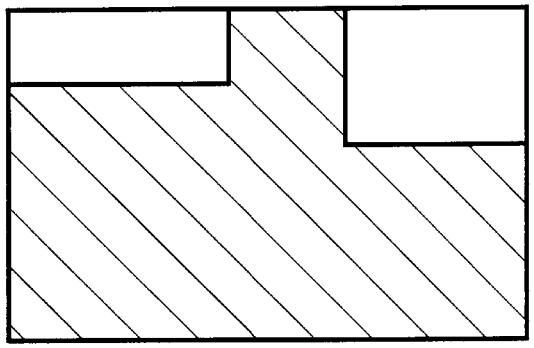
(b)
FIG.10
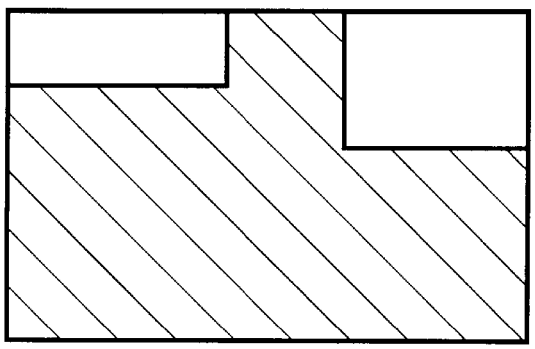
(a)
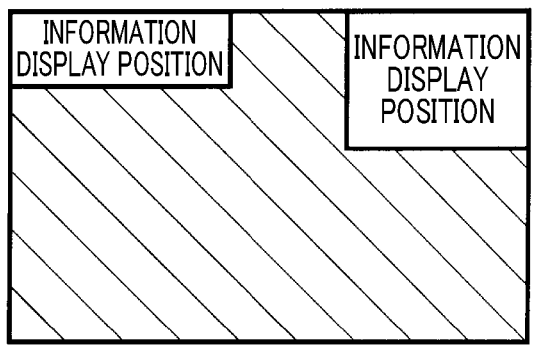
(b)

POSITION OF XY PLANE

INFORMATION DISPLAYING SYSTEM PROVIDED WITH HEAD-MOUNTED TYPE DISPLAY

CROSS-REFERENCE TO RELATED APPLICATION

This application is based on and claims the benefit of priority from earlier Japanese Patent Applications No. 2015-234680 filed on Dec. 1, 2015 and No. 2015-230572 filed on Nov. 26, 2015 the descriptions of which are incorporated herein by reference.

BACKGROUND

Technical Field

The present invention relates to an information displaying system provided with a head-mounted type display. More particularly, the present invention relates to an information displaying system provided with a head-mounted type display that displays operation information of a production facility on a display unit to be mounted on the head by a worker.

Related Art

In the case of the conventional facility in which a man coexists with a robot, for example, when a robot controller detects that a worker approaches by using a light curtain or a laser sensor, the robot controller is configured to pause the operation of a robot arm or to operate the robot arm at a safe and low speed such that the safety of the worker has been secured in this control method.

For example, a technology through which an image of virtual reality and a plurality of information are configured to be projected on a display unit to be mounted on the head by a worker has been proposed in a patent literature document 1, and the like. Furthermore, the aforementioned technology is accordingly applied and assumed to display and deliver operation information of a robot and other related information thereof to the worker who approaches a region in which the robot is in the process of operation.

RELATED ART DOCUMENTS

Patent Document

[Patent Document 1] Japanese Patent Application Publication No. 2014-95903

For example, a head-mounted type display is provided with a glasses type and a portion corresponding to glasses lenses is a transparent display unit. In this case, as described on the above-mentioned operation information, when a text message, and the like are always displayed on a predetermined region of the transparent display unit, it is assumed that the corresponding information image may be overlapped with an actual view that the worker sees through the transparent display unit. For this reason, a view of the worker is obstructed, which causes deterioration in work efficiency.

SUMMARY

The present invention has been made in an effort to provide an information displaying system by which required information is able to be displayed on a transmission type display unit without obstructing a view of a worker to the utmost extent.

An exemplary embodiment of the present invention provides an information displaying system, including: a calculation unit to calculate a display form of a production facility coming into a view of a worker through a display unit of a head-mounted type display from a position of a production facility and three-dimensional shape information thereof, and a position and an eye-gaze direction information of a worker acquired through a position direction information acquisition unit; and a display controller to set a portion of the production facility coming into the view of the worker as a display prohibition region on the display unit, and to display the operation information in a region excluding the display prohibition region when information of the display form and operation information of the production facility are acquired.

According to the configuration described above, the operation information of the production facility is displayed only in a background view thereof, and also is displayed in the view of the worker through the display unit of the head-mounted type display in a state that an actual view of the production facility seen through the display unit is not overlapped with the operation information. Consequently, the worker may secure his or her visibility of the production facility, thereby visually recognizing the operation information of the production facility displayed on the display unit.

Furthermore, the meaning of "a view of a worker is obstructed" described in the present invention is that it becomes hard to visually recognize a facility and a robot at a near or close distance when information is displayed by being overlapped with the facility, the robot, and the like that exist so close to the worker that they come into the view of the worker. In general, the worker performs his or her work at a near or close distance from the worker. However, in a state that the facility and the robot at the near or close distance are not clearly visible while the corresponding work is performed, it is significantly inconvenient for the worker not to proceed with the work according to his or her intention.

On the other hand, since the facility, the robot, and the like that exist far away from the worker may not be involved in the work of the worker, overlapping an information display therewith does not result in any inconvenience to the worker. Consequently, when the information display is overlapped with the facility, robot, and the like that exist at a near or close distance from the worker, the view of the worker may be obstructed.

According to a preferred embodiment, the calculate unit acquires posture information of a robot main body of the robot when an industrial robot is included in the production facility, and changes the display form of the production facility depending on a posture change of the robot main body. That is, for example, in the case of a multi-axis robot, when a robot arm, which is the main body of the robot, of posture dynamically is changed is included in the production facility, a posture change of the robot arm is reflected on the display form. Therefore, even in the case in which the robot arm is moving within the view of the worker through the display unit, the display prohibition region is set in consideration of the movement thereof such that the worker may visually recognize the operation information without any inconvenience caused by the arm movement.

According to another preferred embodiment, the calculate unit does not set the production facility that remains away more than a fixed distance from the worker as the display prohibition region. Therefore, the production facility that remains away more than the fixed distance is observed as a significantly small object within the view of the worker such that the aforementioned production facility is not considered as visible information. Accordingly, the operation information is displayed in the region, thereby more widely securing a displayable region of the information.

Furthermore, according to another preferred embodiment, the display controller prohibits the operation information when an eye-gaze direction of the worker is inclined toward an inclination angle at more than a fixed angle. That is, when the worker looks down and eye-gaze is directed downward, a floor surface in which the production facility is installed is set to be displayed in the view of the worker. In this case, when the operation information is displayed in the region excluding the display prohibition region, the view around worker's foot may be obstructed. Accordingly, it is prohibited to display the operation information such that the worker may secure the view around worker's foot in a convenient way.

Additionally, according to another preferred embodiment, the production facility including: a robot main body; and a direction information output unit for outputting direction information so as to detect a head direction toward which the front-side of the head of the worker, who is positioned within a working region of the robot main body, faces, and the display controller is configured to display the operation information by replacing an image displaying an actual view shown when the robot main body comes into the view of the corresponding worker from the position of the worker with the operation information, in a state that a current head direction of the worker that is detected by the direction information faces toward a direction in which the robot main body does not come into a view of the corresponding worker in the region excluding the display prohibition region.

According to the configuration described above, even in the case in which the worker turns his or her back to the robot arm such that the worker is in a position that he or her may not directly see the robot arm, image data of the robot main body is projected on the head-mounted type display, for example, in a state that the robot main body is observed when the worker looks back at the robot main body from the aforementioned position. Consequently, the worker may visually recognize a state of the robot arm disposed at the rear-side of the worker according to the image displayed on the head-mounted type display, thereby having an advantage of improving the level of safe working conditions and also more abundantly describing the information display on the display unit.

BRIEF DESCRIPTION OF THE DRAWINGS

In the drawings:

FIG. 9 is a drawing illustrating an image of hatching processing at step S9;

FIG. 10 is a drawing illustrating an example of a display region configuration of operation information on a display unit;

DETAILED DESCRIPTION OF THE PREFERRED EMBODIMENTS

Hereinafter, exemplary embodiments of the present invention is described in detail with reference to the accompanying drawings from FIGS. 1 to 16.

Figure 1:
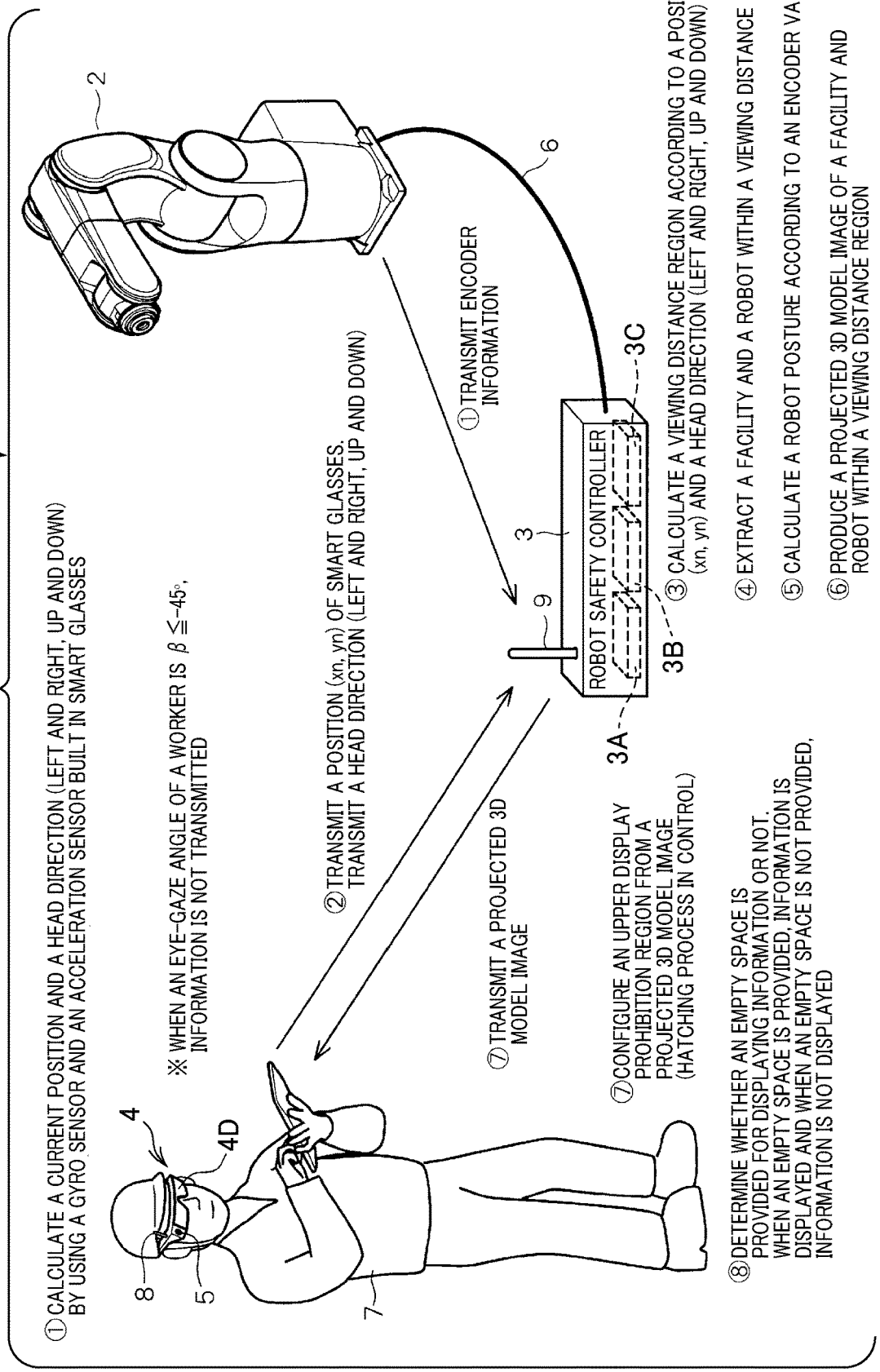
FIG. 1 schematically illustrates a functional block diagram of a configuration of an information displaying system according to an exemplary embodiment of the present invention.

As shown in FIG. 1, for example, an information displaying system 1 provided with a head-mounted type display according to an exemplary embodiment of the present invention is composed of a robot arm 2 for ab assembly, a robot safety controller 3, smart glasses 4, and a sensor unit 5.

For example, the robot arm 2, which is a robot main body, is composed of a six-axis vertical multi-joint robot. A detailed description with respect to a general constitution thereof is omitted. The robot arm 2 has a six-axis arm which is driven by each of the servo motors. Additionally, a hand for firmly grasping, for example, a workpiece received in a pallet is provided at the tip portion of the sixth axis arm. The robot arm 2 is connected to a robot controller (not shown) such that each axis of the sever motors is controlled by the robot controller.

The robot safety controller 3 corresponding to a calculation unit is connected to the robot controller via a cable 6, and acquires three-dimensional position coordinate information (x, y, z) of the robot arm 2 that the robot controller maintains and also acquires an encoder value from an encoder (not shown), which is disposed at each axis. In addition, the robot safety controller 3 maintains a shape of the robot arm 2 and 3D model image data acquired by performing three-dimensional modeling processing on shapes of various production facilities, and the like disposed around the robot arm 2 in an internal memory.

Furthermore, the robot safety controller 3 acquires operation information of the production facilities including the robot arm 2 through the robot controller, and the like. Here, with respect to the operation information, for example, information of the robot arm 2 in operation is described as follows:

State: Automatic operation in process
Speed: 500 m/s
Distance: 2 m
Power: 200V
Torque: 65 N Furthermore, the robot arm 2 in a suspended state is described as follows:

[State: suspended state], [Speed: 0 m/s], [Torque: ON]

The robot safety controller 3 is composed as a computer including CPU (Central Processing Unit) 3A in charge of processing arithmetic operation, ROM (Read-Only Memory) 3B, and RAM (Random Access Memory) 3C, and is also composed to communicate with an external device. According to the operation, the CPU 3A reads a control program and a processing program for implementing the above-mentioned control and processing that are stored into ROM3B in advance in the corresponding working region and further implements the programs described above in order.

For this reason, the ROM 3B performs a function as a non-transient computer readable recording medium. The RAM3C is performed to store temporary data during the processing stage in which the CPU 3A implements the program.

Smart glasses 4 functioning as a head-mounted type display are mounted on the head by a worker 7 like glasses and are a transmission type display projecting an image through a display controller (not shown) on a transparent display unit 4D corresponding to glasses lenses. The display unit 4D is described with reference to FIG. 3. A sensor unit 5 functioning as an output unit of position direction information is built in one side part of frames of the smart glasses 4

Additionally, the smart glasses 4 are generally referred to as a wearable device and also cyber glasses.

The sensor unit 5, for example, is provided with a gyro sensor, an acceleration sensor, etc., thereby outputting relative position information of the worker 7 with respect to an origin of coordinates in calculation, a front-side information of the head of the worker 7 with the smart glasses 4 mounted on the head, and eye-gaze information providing an eye-gaze direction such as up-down or left-right direction. Furthermore, as described hereinafter, when the worker 7 starts to work, origin position information is able to be separately acquired.

The smart glasses 4 build a wireless communications unit 8 shown in FIG. 1 as a symbol of an antenna in a frame, and further is configured to communicate with a wireless communications unit 9 of the robot safety controller 3 also shown in FIG. 1. The wireless communications unit 8 transmits a respective signal of the sensor unit 5 to the robot safety controller 3, and the wireless communications unit 9 transmits the 3D model image data that the robot safety controller 3 maintains to the smart glasses 4 after completing the processing (described hereinafter) of the 3D model image data.

Figure 2:
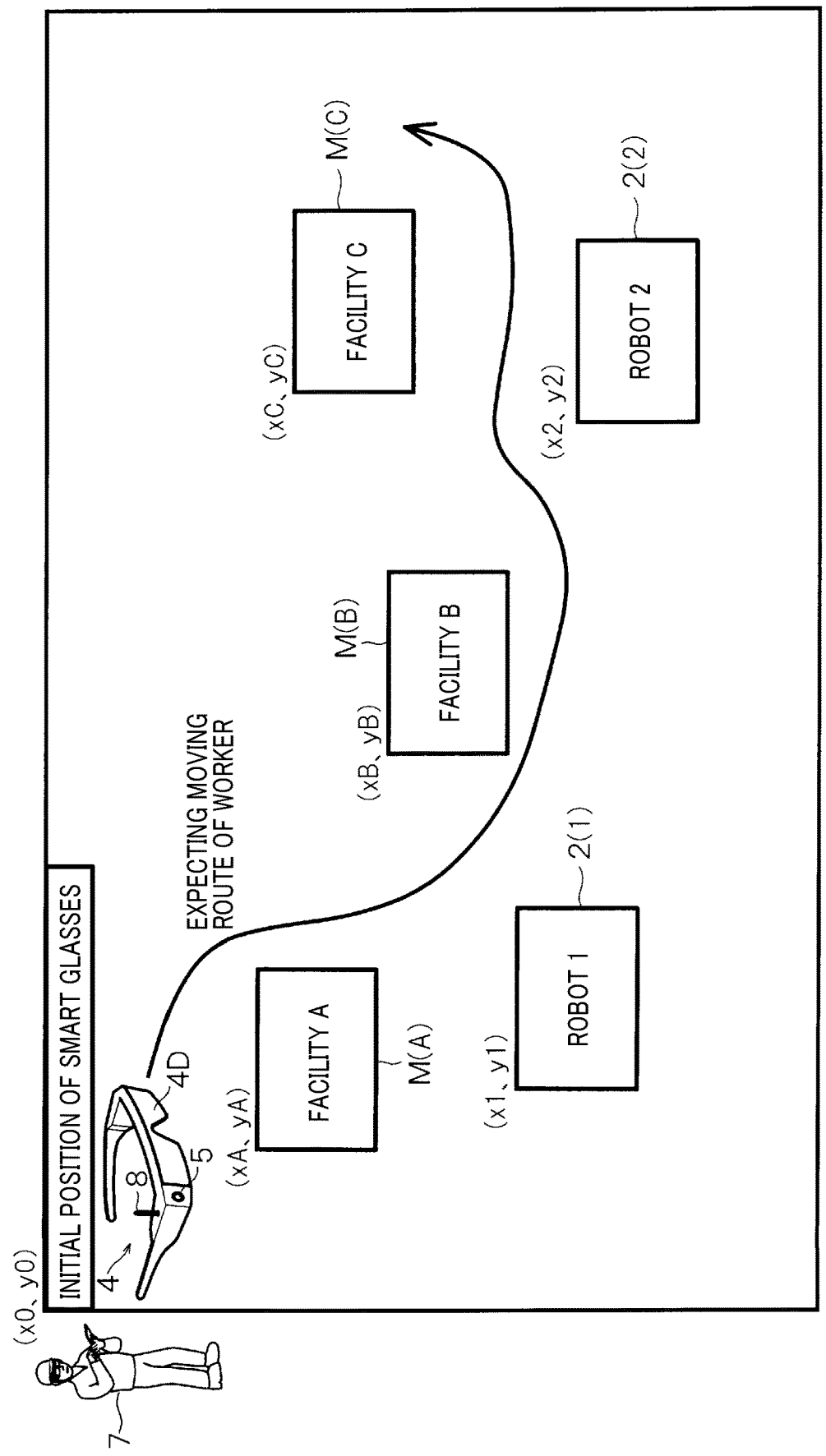
FIG. 2 is a drawing illustrating an example of a factory coordinate system.

Next, operation methods according to the exemplary embodiments of the present invention are described with reference to FIGS. 2 to 16. As shown in FIG. 2, the robot safety controller 3 in a factory is provided with a robot arm 2(1) and 2(2), and also is provided with information of a factory coordinate system, which is two-dimensional coordinate information with respect to a respective disposition of other production facilities M(A) to M(C). The worker 7 is defined to start his or her work at an origin position (x 0, y 0) of the factory coordinate system such that an information processing unit built in the smart glasses 4 is configured to recognize the origin position.

Figure 3:
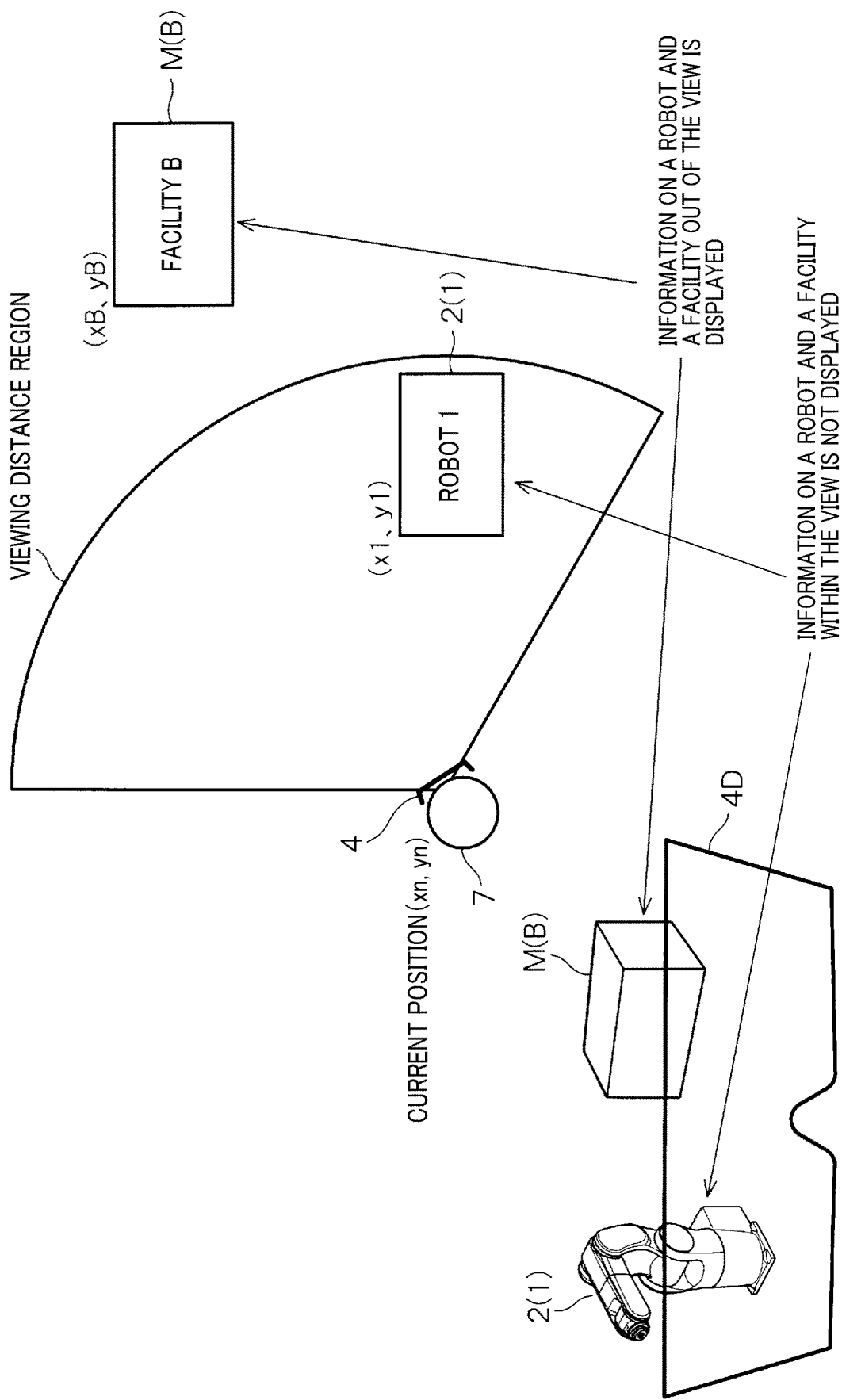
FIG. 3 is a drawing illustrating a viewing distance region.

FIG. 3 is a drawing illustrating a view state to be seen through the display unit 4D by the worker 7 mounted with the smart glasses 4. The smart glasses 4 set a viewing distance region in such a manner that the robot arm 2, and the like (described hereinafter) are considered as an object of a display prohibition region. For example, in the case of an exemplary embodiment shown in FIG. 3, the robot arm 2(1) disposed within the view distance region is defined as the object of the display prohibition region, whereas a facility M(B) disposed out of the view distance region is not defined as the object of the display prohibition region. Since the facility M(B), within the view of the worker 7, seen through the display unit 4D looks small and some portions thereof are only visible, it does not cause a problem to exclude the facility M(B) as visible information. In addition, the view distance with respect to the view distance region corresponds to a fixed distance described in claim 3.

Figure 4:
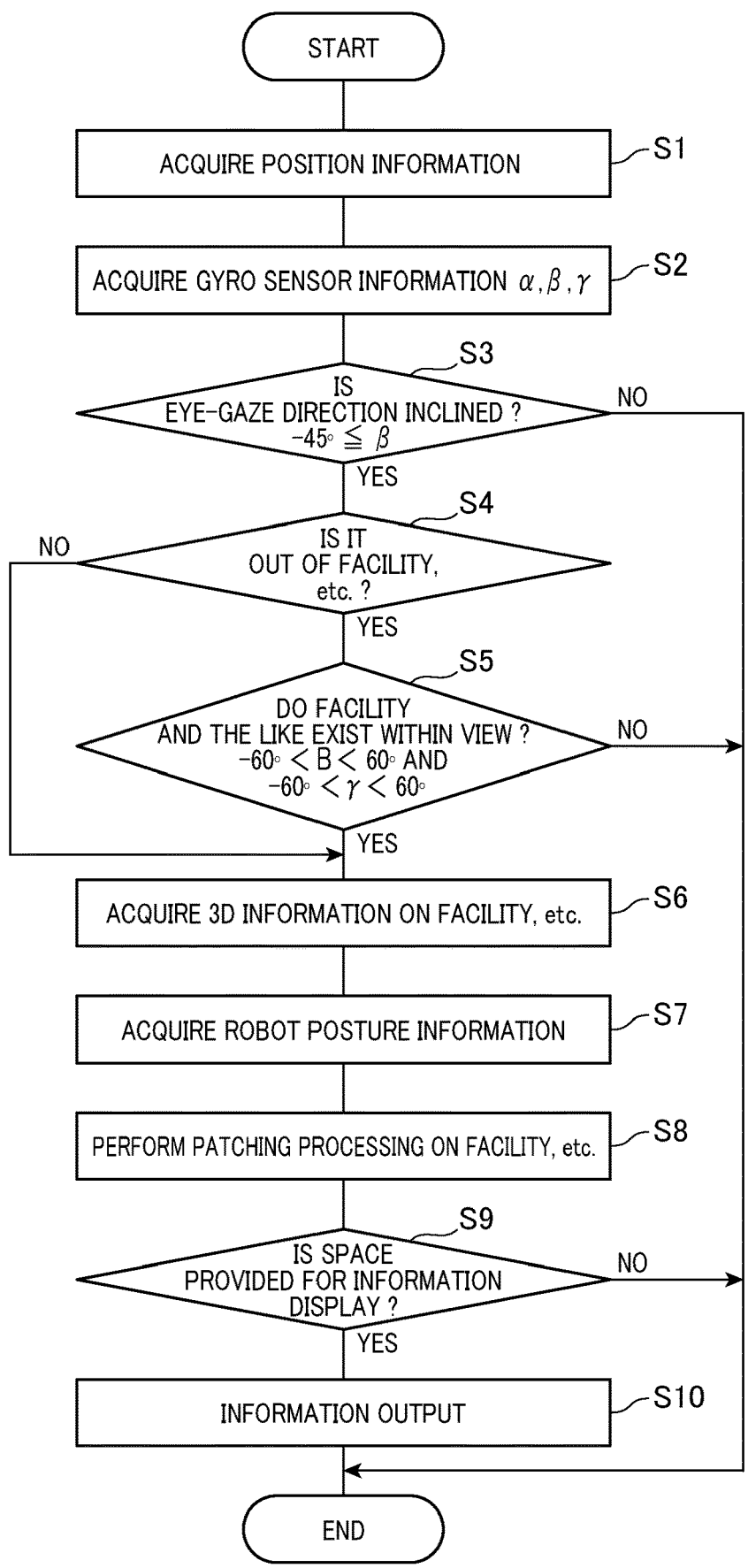
FIG. 4 illustrates a flowchart of a processing system performed by a robot safety controller and smart glasses.
Figure 5:
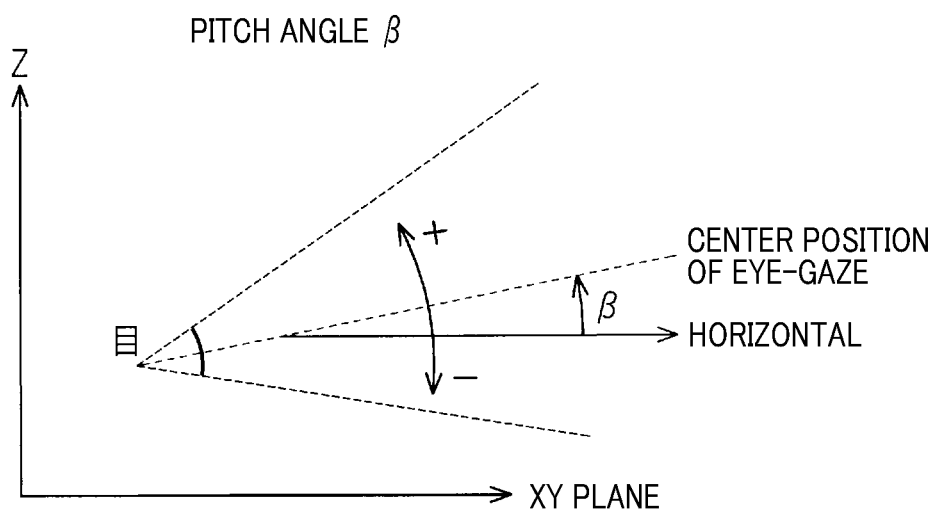
FIG. 5 illustrates a diagram of a pitch angle measured by a gyro sensor in a factory coordinate system.
Figure 6:
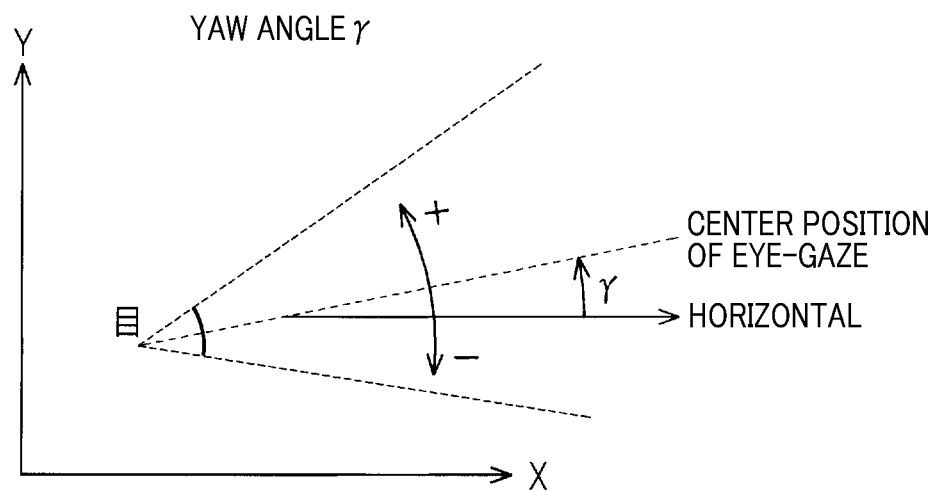
FIG. 6 is a drawing illustrating a yaw angle measured by a gyro sensor in a factory coordinate system.

FIG. 4 illustrates a flowchart of a processing system performed by the robot safety controller 3 and the smart glasses 4. The flowchart is repetitively performed at a regular interval. The safety controller 3 acquires origin position information on the worker 7 inside a factory (that is, a factory coordinate system) through the smart glasses 4 at step S1, and subsequently acquires sensor information such as a gyro-sensor according to the sensor unit 5 at step S2. If a plane of a factory shown in FIG. 2 is described as XY plane, as shown in FIG. 6, a direction angle within the XY plane is described as a yaw angle γ. Additionally, as shown in FIG. 5, an inclination of a Z axial direction based on a horizontal plane is described as a pitch angle β. In the case of a roll angle α, it may be accordingly considered or also may be ignored on the condition that the roll angle α is always 0 degree.

Figure 7:
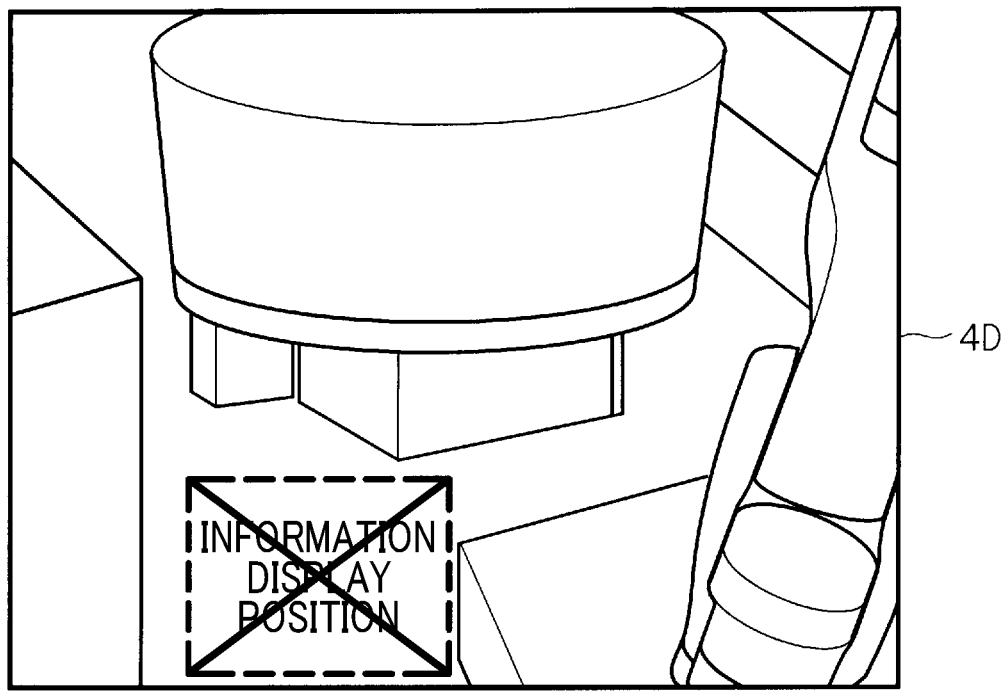
FIG. 7 is a drawing illustrating an example of a view image when operation information is prohibited to be displayed in accordance with determination at step S3 (Part 1)
Figure 8:
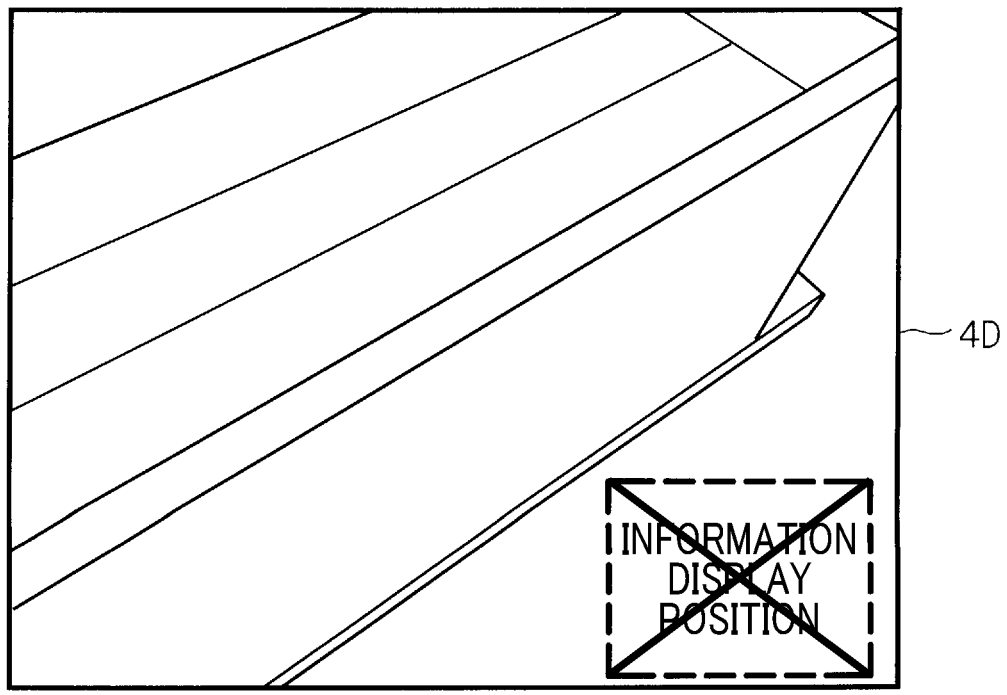
FIG. 8 is a drawing illustrating an example of a view image when operation information is prohibited to be displayed accordance with determination at step S3 (Part 2)

Next, it is determined whether an eye-gaze angle of the worker 7 is inclined at more than 45 degrees toward a inclination angle according to the pitch angle β at step S3 or not. When the eye-gaze angle is inclined at equal to or more than 45 degrees in its minus(−) direction (−45°≤β: YES), the processing ceases to exist. That is, when the worker 7 looks down and eye-gaze is directed downward, as shown in FIGS. 7 and 8, a floor surface in which the robot arm 2 and the facility M are installed is set to be displayed in the view of the worker 7. In this case, as described later, when operation information is displayed on the display unit 4D, a view around worker 7's foot may be obstructed. Accordingly, it is prohibited to display the operation information on this display unit 4D such that the view around worker 7's foot is able to be secured When the inclination angle of the eye-gaze direction of the worker 7 is less than 45 degrees in its minus(−) direction at step S3 (−45°>β: NO), it is determined whether the worker 7 exists away from the facilities, and the like or not, according to the position information based on the factory coordinate system of the worker 7 at that time at step S4. In this case, the facilities, and the like include the facility M and the robot arm 2. In addition, it is determined whether the worker 7 exists out of a safety fence installed around the robot arm 2 or not.

When the worker 7 exists out of the facilities, and the like at step S4 (YES), it is determined whether the facilities, and the like exist in the view of the worker 7 through the display unit 4 of the smart glasses 4 or not at step S5. More specifically, it is determined whether the facilities, and the like exist within −60 degrees to +60 degrees of the pitch angle based on the eye-gaze of the worker 7, and within −60 degrees to +60 degrees of a yaw angle based on the same eye-gaze of the worker 7 or not. When the facilities, and the like exist (YES), the 3D model image data of the closest facilities, and the like disposed within the view of the worker 7 are acquired at step S6.

The robot arm 2(1) is described in an example shown in FIG. 3. Furthermore, when it is determined as "NO" at step S4, it proceeds to step S6. Thus, when the facility is the robot arm 2, an encoder value, which is posture information, is acquired at step S7. The safety controller 3 transmits respectively acquired information to the smart glasses 4.

When the smart glasses 4 produces shapes of the facilities, and the like reflected in the view of the worker 7 through the display unit 4D according to the 3D model image data, a region that reflects the facilities, and the like is set as the display prohibition region and then hatching processing is performed at step S8. FIG. 9 illustrates an image of the hatching processing. In the case of a region illustrated by the hatching process in FIG. 9(*b*), actual images of the facilities, and the like are reflected in the view of the worker 7. In addition, it is determined whether a space is provided for displaying the operation information of the facilities, and the like on the display unit 4D or not at step S9. When the enough space is provided (YES), it is determined to be able to display information, and then the above-mentioned operation information is displayed on the corresponding space as shown in FIG. 10(*b*) at step S10.

Figure 11:
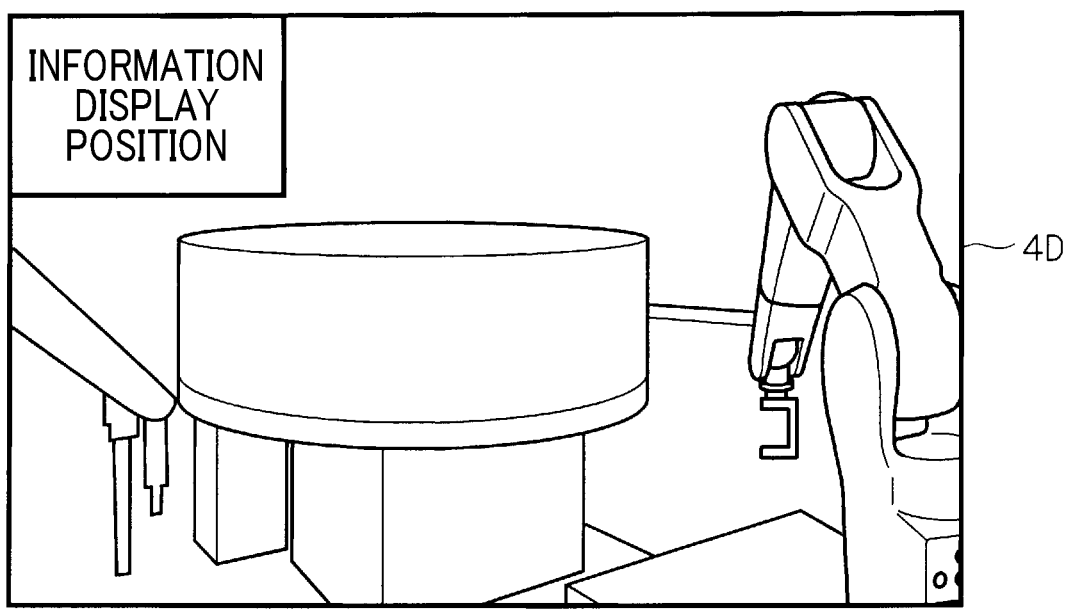
FIG. 11 is a drawing illustrating an example of a specific display image on a display unit (Part 1)
Figure 12:
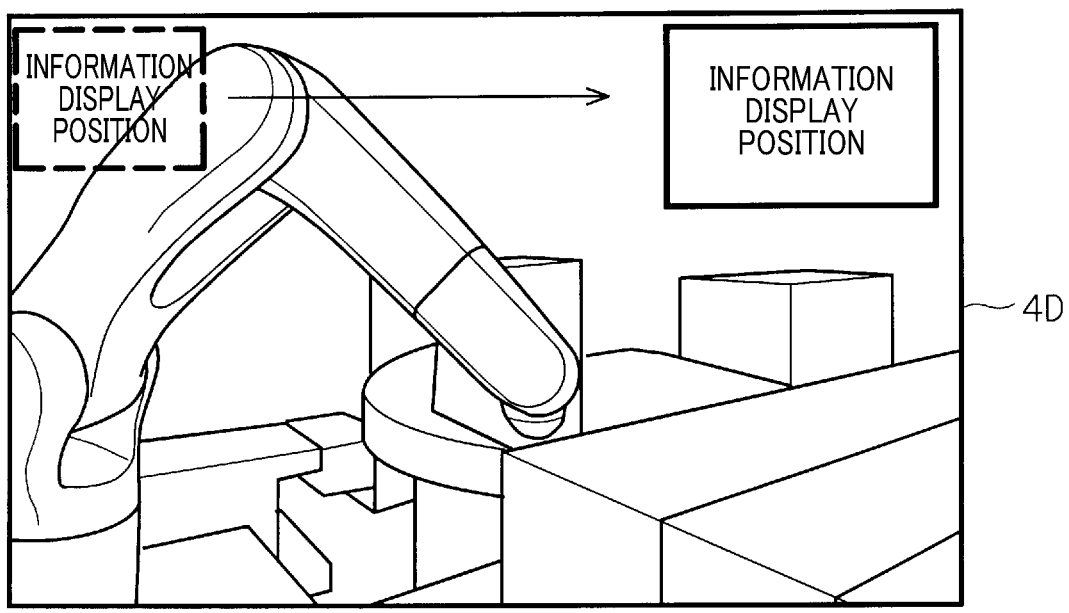
FIG. 12 is a drawing illustrating an example of a specific display image on a display unit (Part 2)

Hereinafter, exemplary embodiments of the operation information display is described more in detail in FIGS. 11 to 16. FIG. 11 illustrates an empty space in left upper corner of the display unit 4D and displays the operation information in the empty space. FIG. 12 illustrates an empty space in left upper corner of the display unit 4D, and while displaying the operation information in the empty space like FIG. 12, a posture of the robot arm 2 is changed such that the display prohibition region is accordingly set. In this case, the operation information is displayed in the right upper corner of the display unit 4D.

Figure 13:
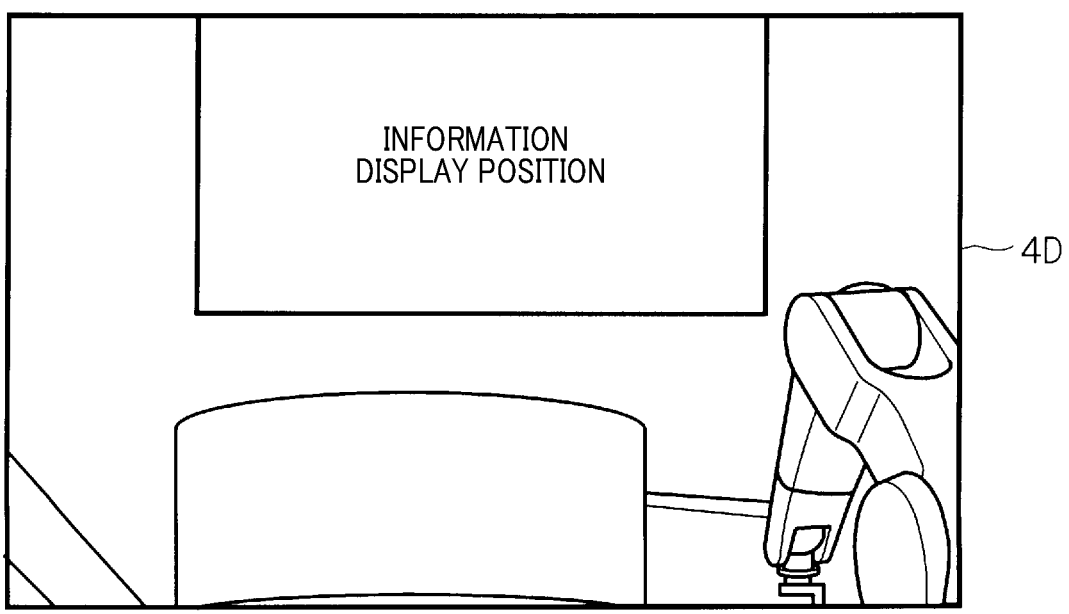
FIG. 13 is a drawing illustrating an example of a specific display image on a display unit (Part 3)
Figure 14:
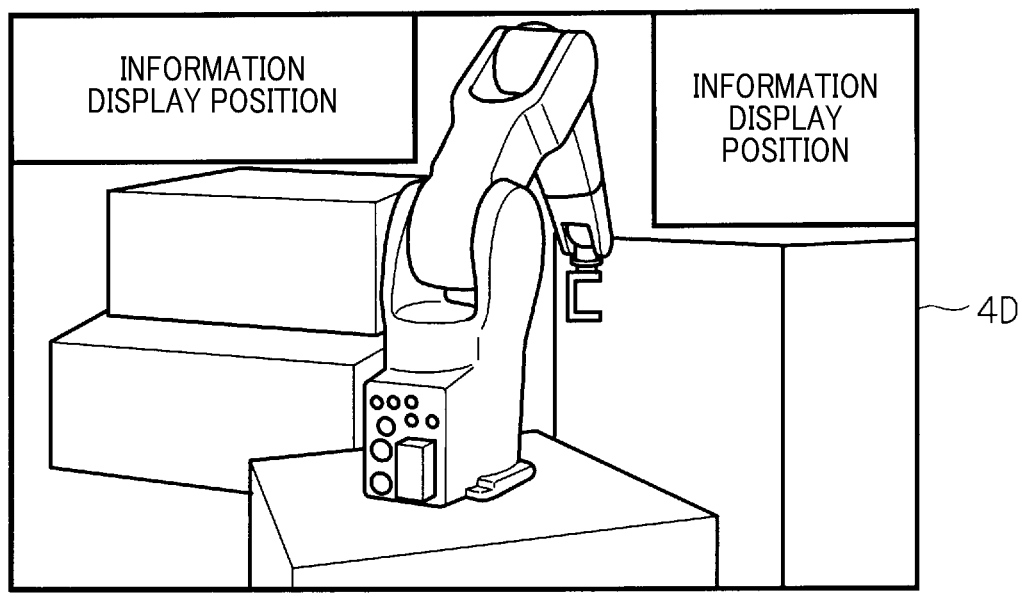
FIG. 14 is a drawing illustrating an example of a specific display image on a display unit (Part 4)
Figure 15:
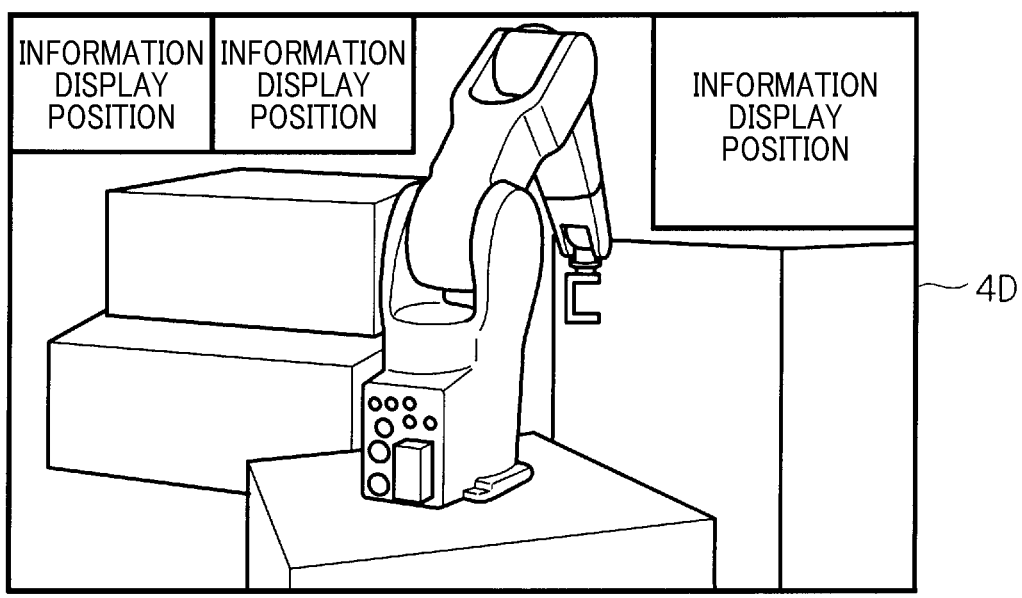
FIG. 15 is a drawing illustrating an example of a specific display image on a display unit (Part 5)

As described in FIG. 13, when a big empty space is provided from a center portion of the display unit 4D to an upper portion thereof, information is displayed in the corresponding big empty space. FIG. 14 illustrates that the robot arm is disposed in the center portion of the display unit 4D such that empty spaces are provided at the left upper corner of the display unit 4D and the right corner thereof. In this case, the operation information may be divided into both sides and accordingly displayed therein and also the operation information of the surrounding facilities, and the like may be dividedly displayed at the above-mentioned both sides. Furthermore, FIG. 15 illustrates an example of displaying the operation information in three empty spaces by additionally dividing the empty space of the left upper corner in FIG. 14 into two empty spaces.

Figure 16:
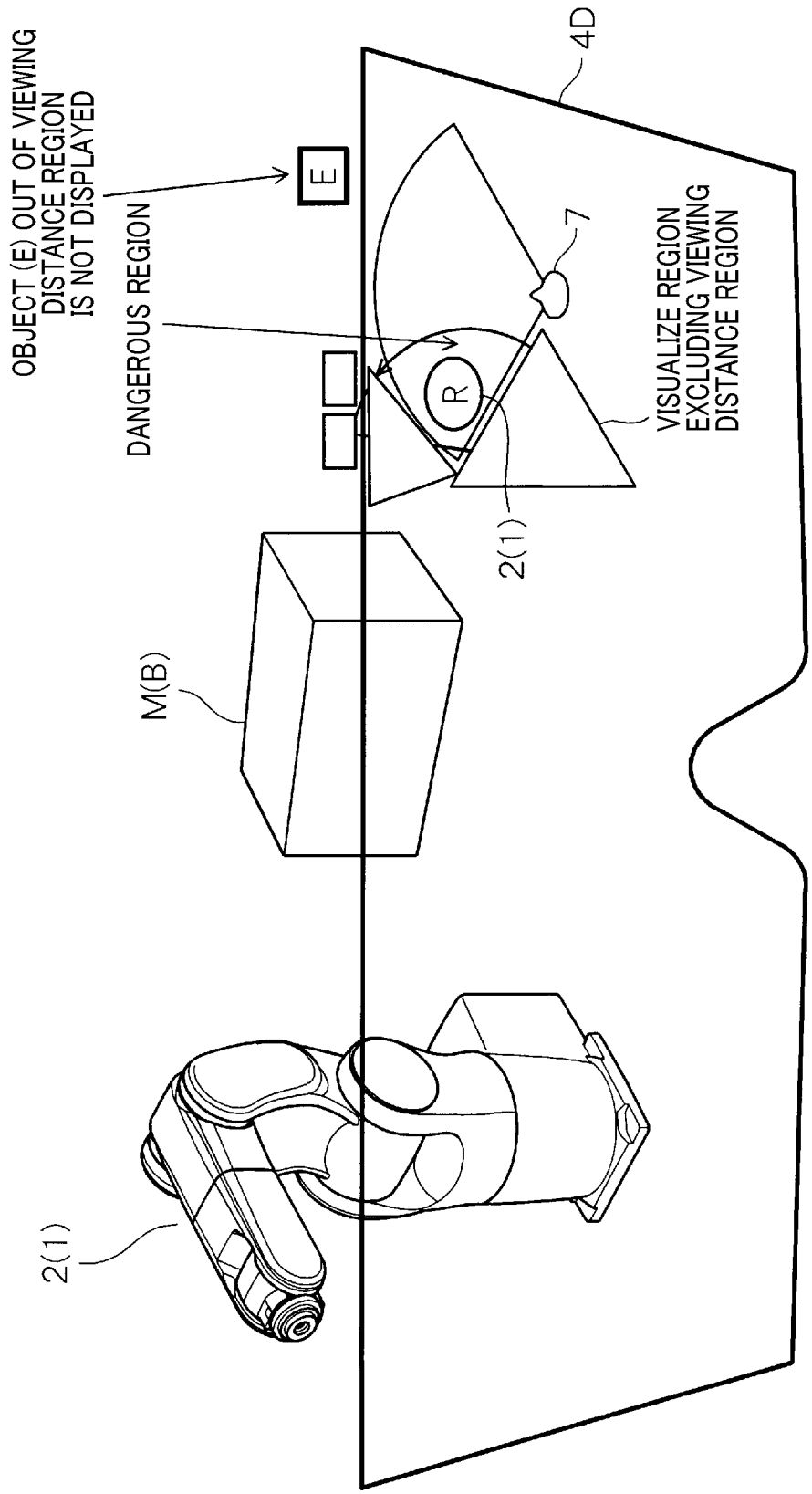
FIG. 16 is a drawing illustrating an example of a graphic image of a position relationship between a worker and a facility as operation information.

Furthermore, as the operation information, FIG. 16 is a drawing illustrating an example of a graphic image of a position relationship between the worker 7 and the facilities, and the like. A position of the robot arm 2 (1) disposed within a viewing distance region of the worker 7 is illustrated and also a region in which the robot arm 2 is in operation is displayed as a dangerous region in FIG. 16. In addition, with respect to a region excluding the viewing distance region, the region is visually displayed with a triangle shaped region.

As described above, according to the exemplary embodiment of the present invention, the safety controller 3 calculates display forms of the facilities, and the like coming into the view of the worker 7 through the display unit 4D of the smart glasses 4 from each position of the robot arm 2 and the facility M, and three-dimensional shape information thereof, and the position of the worker 7 and eye-gaze direction information acquired through the sensor unit 5. When the smart glasses 4 acquire the information of the display forms and the operation information of the facilities, and the like, portions of the facilities, and the like coming into the view of the worker 7 are set as the display prohibition region on the display unit 4D and the operation information is displayed in the region excluding the display prohibition region.

According to the configuration described above, the operation information of the facilities, and the like is displayed only in a background view thereof, and also is displayed in the view of the worker 7 through the display unit 4D of the smart glasses 4 in a state that actual views of the facilities, and the like seen through the display unit 4D are not overlapped with the operation information thereof. Consequently, the worker 7 can secure his or her visibility of the facilities, and the like, thereby visually recognizing the operation information of the facilities, and the like displayed on the display unit 4D.

In addition, when a robot is included in the facilities, and the like, the safety controller 3 acquires the posture information of the robot arm 2, and then accordingly changes the display forms of the facilities, and the like depending on a posture change of the robot arm 2. Therefore, even though the robot arm 2 is in operation within the view of the worker 7 through the display unit 4D, the display prohibition region is accordingly set in consideration of movement of the robot arm 2, such that the worker 7 is able to visually secure the operation information without any obstruction caused by the movement of the robot arm 2.

Furthermore, the safety controller 3 does not set the facilities, and the like that remain away from the worker 7 more than the fixed distance as the display prohibition region. That is, the facilities, and the like that remain away more than the fixed distance are observed as significantly small objects within the view of the worker 7 such that the aforementioned facilities, and the like are not considered as visible information. Accordingly, the operation information is displayed in the region, thereby more widely securing a displayable region of information.

Additionally, when the eye-gaze direction of the worker 7 is inclined toward an inclination angle at more than a predetermined angle, the smart glasses 4 prohibit the operation information. Accordingly, it is prohibited to display the operation information such that the view around the worker 7's foot is able to be secured. Furthermore, in the case in which the displayable region of the operation information on the display unit 4D becomes smaller than a fixed size due to the increase of the display prohibition region, the operation information is prohibited to be displayed on the smart glasses 4. That is, the operation information that the worker 7 cannot display in a visually secured state is not displayed, thereby more enlarging the view of the worker 7.

Accordingly, when the smart glasses 4 is able to set a plurality of the displayable regions of the operation information depending on a position of the display prohibition region on the display unit 4D, the operation information is displayed in a plurality of the displayable regions. For example, in the case in which two kinds of facilities, and the like are present, each of the operation information is able to be respectively displayed in two displayable regions.

Furthermore, the safety controller 3 produces the position relationship between the worker 7 and the facilities, and the like as image data, and includes the image data in the operation information. According to the configuration described above, the worker 7 is able to simply recognize the position relationship between the worker 7 himself or herself and the facilities, and the like according to an image displayed on the display unit 4D, thereby more efficiently improving work stability.

It is to be understood that the present invention is not limited to the disclosed drawings and embodiments, but, on the contrary, is intended to cover various modifications and equivalent arrangements described hereinafter.

When the display prohibition region is set, a 3D model based image is not necessarily required to be used for the facilities and the like. Mapping data of a three-dimensional coordinate value may be used, and vertices of outer shapes of the facilities, and the like, which are coordinate values of each protruded tip thereof, may be only used.

A display form shown in FIG. 16 may be performed depending on the necessity.

The robot main body is not intended to be limited to the robot arm 2. For example, a robot arm based on a horizontal four axis constitution, a self-propelled robot, and a humanoid robot may be also included. When the worker 7 starts to work and the origin position information is not able to be acquired, global coordinate information of the worker 7 is acquired by additionally installing a GPS gyro sensor in the sensor unit 5. In this way, matching processing with the factory coordinate system may be performed.

The function of the robot safety controller 3 may be provided into the robot controller.

Specific angle values at steps S3 and S5 may be considered to be accordingly adjusted depending on an individual design.

A laser sensor and an infrared sensor may be used at a position direction information acquisition unit. And, a sensor signal thereof may be directly input into the robot safety controller 3.

All functions of a calculation unit and a display controller may be provided into the safety controller 3 or the smart glasses 4.

The head-mounted display is not necessarily required to be the smart glasses 4, thus the configuration in which an image is projected on a display unit that a worker mounts on the head may be also allowed to be used instead.

(Modifications)

Next, the modifications of the aforementioned exemplary embodiments is hereinafter described.

This modification is another example of an image displayed on the display unit 4D of the smart glasses 4 at an information displaying system 1 equipped with the head-mounted type display described in the above-mentioned exemplary embodiment. For this reason, this modification is able to be performed according to the robot safety controller (CPU3A) described in the aforementioned exemplary embodiment, and also may be additionally performed. Therefore, an image display in the aforementioned exemplary embodiment is replaced or an image (rear-side image) described hereinafter is able to be displayed together. However, in the modification, the aforementioned additional portions are mainly explained, performed in a robot monitor system that is provided as a system example of the information displaying system 1.

Figure 17:
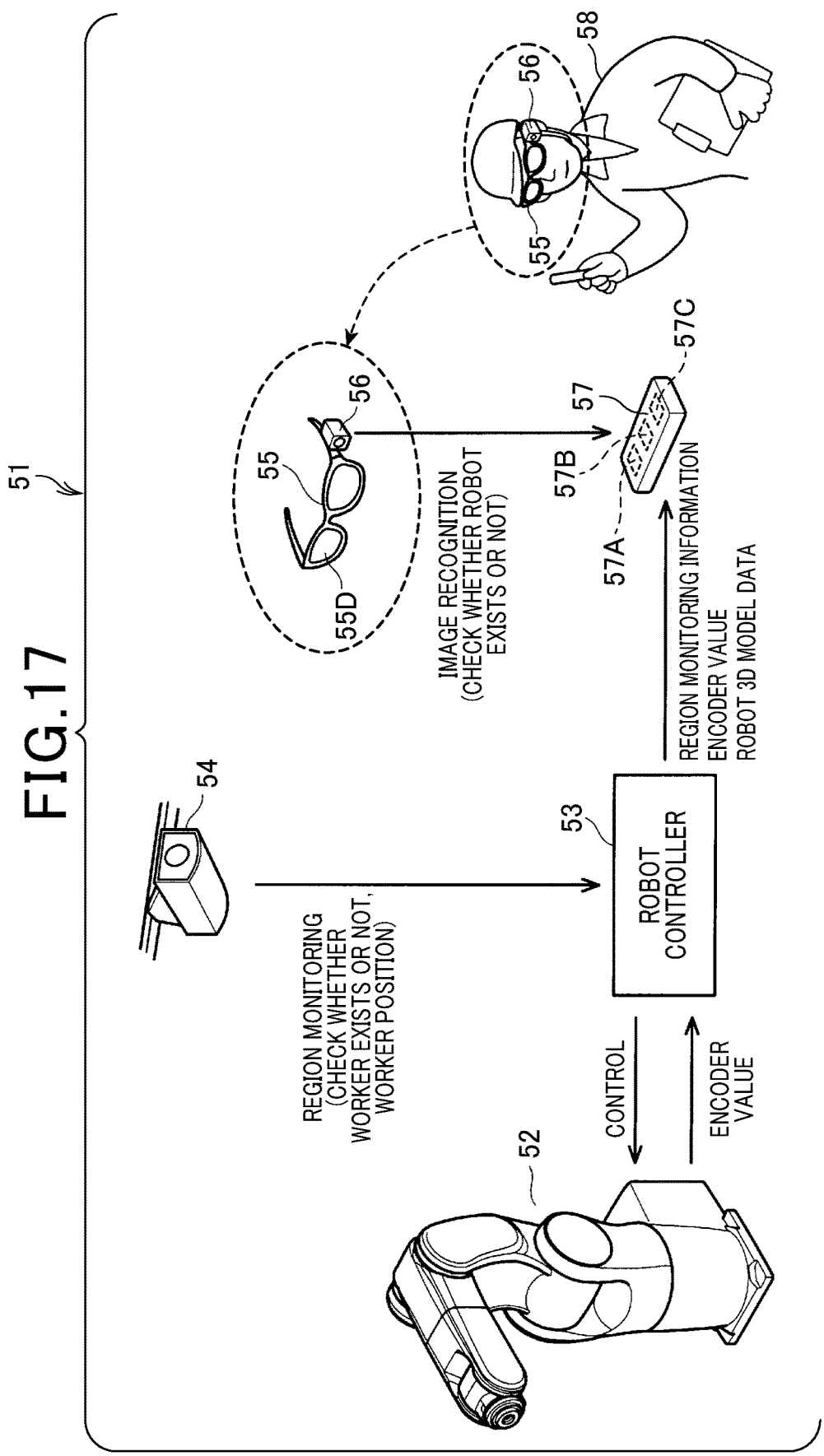
FIG. 17 schematically illustrates a functional block diagram of a configuration of a robot monitor system as an information displaying system with respect to a preferred modification additionally performed in the aforementioned exemplary embodiment.

FIG. 17 schematically illustrates a function block diagram of a configuration of a robot monitor system 51 according to an exemplary embodiment of the present invention. The robot monitor system 51, for example, is composed of a robot arm 52 (robot main body) for an assembly, a robot controller 53 to control the robot arm 52, a camera 54, a glasses-type monitor 55, an annexed camera 56, and a monitor controller 57 for the glasses-type monitor 55. The robot arm 52 is provided as a unit of the production facility by describing the aforementioned exemplary embodiment.

As the same exemplary embodiment described above, the robot arm 52 is, for example, composed of a six-axis vertical multi-joint robot. The robot arm 52 is connected to the robot controller 53 via a cable (not shown) such that a servo motor of the respective axis is controlled by the robot controller 53.

The robot controller 53 corresponding to a control device of a robot is composed by building a control circuit (not shown), a servo control unit, and a power supply into it. The controller circuit is composed of a microcomputer provided with input/output interface, CPU, ROM, RAM, etc. as a main body.

Furthermore, in the case of the robot controller 53, an encoder value from an encoder (not shown) disposed at each axis is input therein in order to perform the above-mentioned robot control. Additionally, the robot controller 53 stores and maintains the 3D model image data produced by performing a modeling process on a shape of the robot arm 52 in a three-dimensional method into an internal memory.

Figure 18:
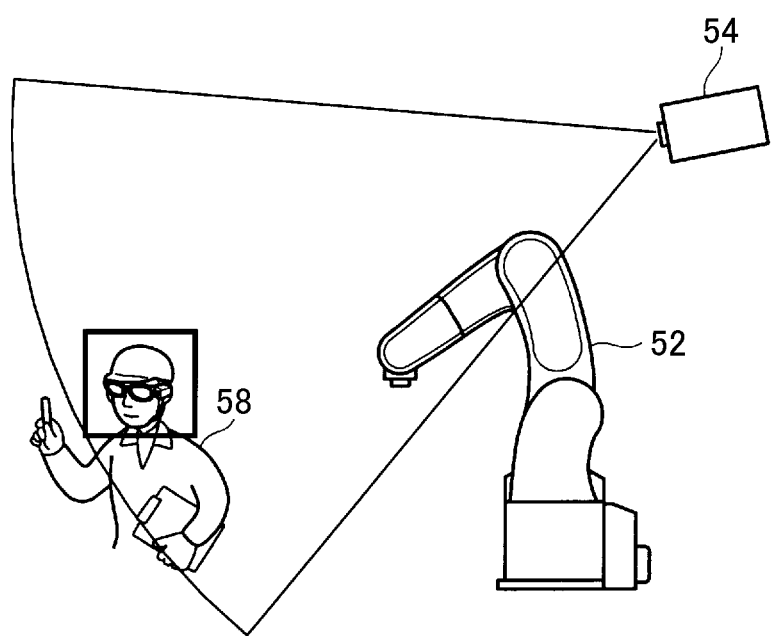
FIG. 18 illustrates a lateral side view of an imaging region according to a camera.
Figure 19:
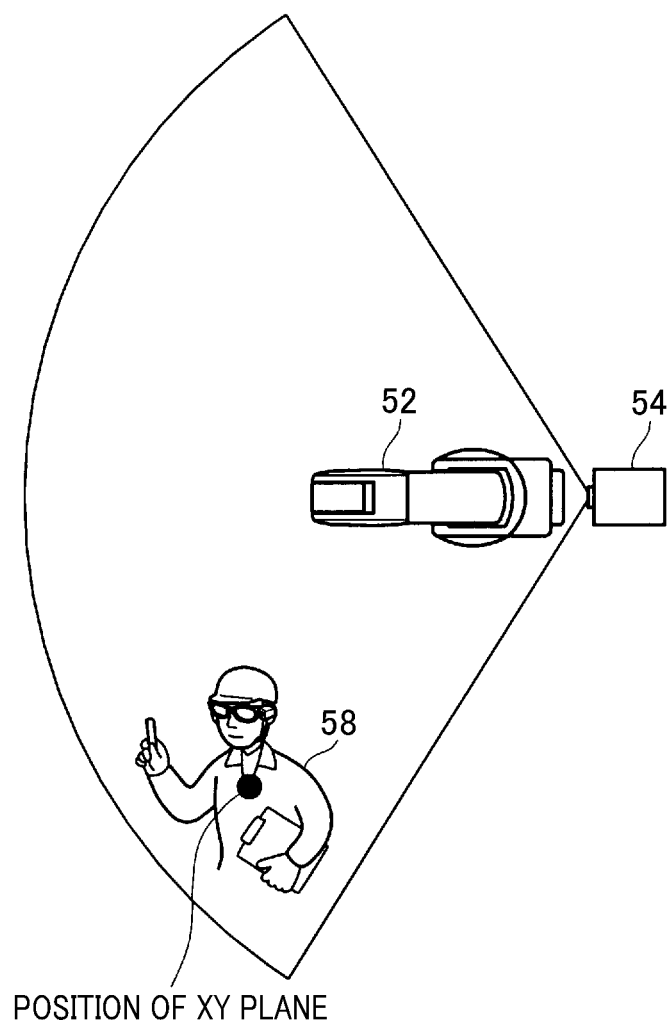
FIG. 19 illustrates a top plan view of an imaging region according to a camera.

The camera 54 is installed for the imaging region to include at least a working region of the robot arm 52. For example, as shown in FIG. 18, the camera 54 is installed in a position in which the working region is overlooked from the information of the robot arm 52. Image data captured by the camera 54 is input into the robot controller 53. The camera 54 corresponds to the position information acquisition unit, and as a top plan view is shown in FIG. 19, while the worker 58 is positioned within the imaging region of the camera 54, the image data to be input is processed by the robot controller 53, thereby acquiring the information of two-dimensional coordinate values (x, y) displaying the position of the worker 58 by describing a position of the robot arm 52 as an origin position.

A glasses-type monitor 55 functioning as a head-mounted type display is mounted on the head of the worker 58 as glasses like the smart glasses of the aforementioned exemplary embodiment as shown in FIG. 17, and is also referred to as a transmission type display that is able to project an image on a transparent display unit 55D corresponding to the glasses lenses through a projection unit (not shown). The glasses-type monitor 55 is referred to as the smart glasses or cyber glasses The annexed camera 56 functioning as a direction information output unit and an imaging device is disposed in one side part of two frames of the glasses-type monitor 5, and the worker 58 with the glasses-type monitor 55 mounted on the head captures an image in the front-side direction of the head of the worker 58. The cameras 54 and 56 are composed of a CCD image sensor and a CMOS image sensor.

The glasses-type monitor 55 is connected wirelessly or by wire to the monitor controller 57 which is a controller device in a display portion. The monitor controller 57 is composed as a computer including CPU57A, ROM57B, and RAM57C in charge of calculation processing, and is also composed to be able to communicate with an external device. The CPU57A reads a control program and a processing program which are stored into the ROM57B in advance in the corresponding working region according to the operation of the CPU57A and further implements the programs described above in order. For this reason, the ROM57B performs a function as a non-transient computer readable recording medium. The RAM57C is performed to store temporary data during the processing stage that the CPU57A implements the programs.

For this reason, according to the operation of the CPU57A, the monitor controller 57 transmits the image data projected on the display unit 55D of the glasses-type monitor 55, and also receives the image data captured by the annexed camera 56. Furthermore, the monitor controller 57 is configured to perform wire or wireless communication with the robot controller 53 and also to acquire monitoring information of a working region including the position information of the worker 58, a respective axis encoder value of the robot arm 52, which is the posture information, and the aforementioned 3D model image data in accordance with the robot controller 53.

According to this modification, two cameras are used as a sensor instead of the sensor unit 5 described in the aforementioned exemplary embodiment, thereby implementing the processing shown in FIG. 20, which is described later in the monitor controller 57.

Next, an operation of an exemplary embodiment is described with reference to FIGS. 20 and 21. FIG. 20 is a flowchart showing the processing of the monitor controller 57. When the monitor controller 57 starts to communicate with the robot controller 53 and are connected there between at step S51, the 3D model image data of the robot arm 52 is acquired at step S52. Subsequently, the processing of step S53 to S64 is configured to be an infinite loop.

When region monitoring information is acquired at step S54, it is determined whether the worker 58 is present or not within the working region of the robot arm 52 at step S55. In the case in which the worker 58 is not present and "NO" is determined, it returns to step S3. In the case in which the worker 58 is present and "YES" is determined, the image recognition operation that processes the image data input by the annexed camera 56 is performed at step S56. In this case, an image capturing the robot arm 52 is included in the above-mentioned image data. Furthermore, in the case in which "YES" is determined at step S57, since the head front-side of the worker 58 is assumed to be generally positioned toward the robot arm 52, "the front-side" is determined at step S58. In this case, it proceeds to step S6 without any particular processing.

On the other hand, in the case in which the image capturing the robot arm 52 is not included in the above-mentioned image data and "NO" is determined at Step 57, since the head front-side of the worker 58 is assumed to be generally positioned in the opposite direction from the robot arm 52, it is described as "rear-side determination" at step S59. In this case, "the opposite direction" means a view out of the current view of the worker 58, and thus a horizontal direction out of the aforementioned current view is also included. For this reason, as described later, the rear-side image data of the worker 58 (rear-side image B I (refer to FIG. 21)), is produced so as to process the 3D model image data of the robot arm 52 and to project it on the display unit 55D of the glasses-type monitor 55 at step S59.

Figure 20:
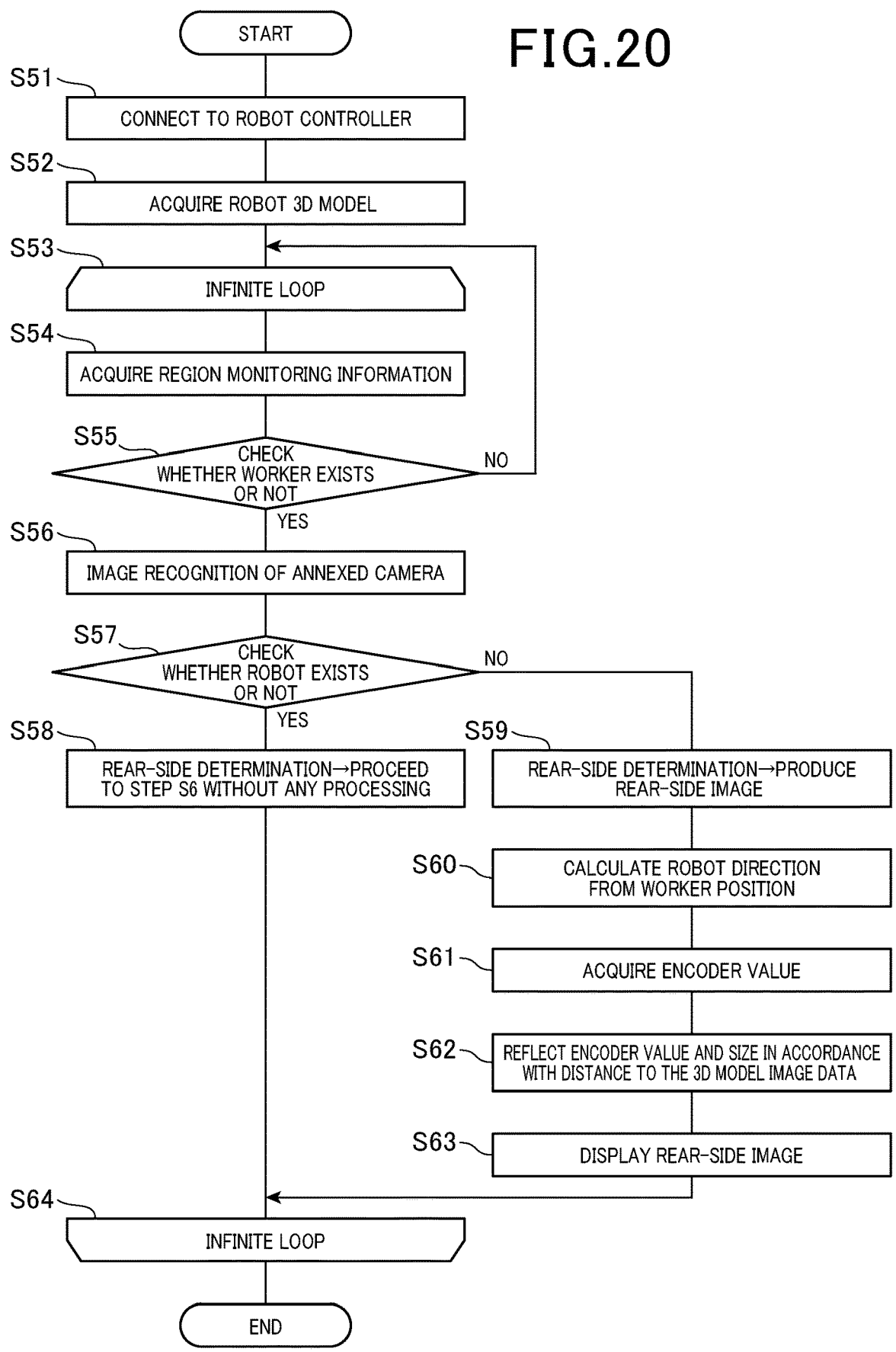
FIG. 20 illustrates a flowchart of a processing system mainly performed by a monitor controller.

In this case, the display controller is functionally configured according to steps S59 to S63 shown in FIG. 20. The processing at step 59 corresponds to a rear-side determination unit, step S60 to S62 corresponds to an image processing unit, and step 63 corresponds to a display processing unit.

Firstly, in the case in which the worker 58 is intended to see the robot arm 52 from the current position, a direction of the robot arm 52 to be seen by the worker 58 is calculated at step S60. Next, in the case in which an encoder value of a respective axis according to the robot controller 53 is acquired at step S61, the encoder value is reflected to the 3D model image data, thereby reproducing the current posture of the robot arm 52. In addition, in this case, since a distance from a position of the worker 58 to an origin position of the robot arm 52 is confirmed, the image data size to be displayed is changed at step S62 depending on the distance. In this case, the image data is adjusted to be displayed as big as a shorten distance there between. A processing stage in which the size of the image data is changed is not necessarily required to be proportional to resolution of a distance. For example, a distance range from a long distance to a short distance is divided into multiple stages, and then the size of the image data may be accordingly adjusted according to the respective stage.

As described above, when the image data of rear-side image BI is produced, the corresponding data is transmitted to the glasses-type monitor 5 and then is displayed on the screen of the display unit 55D at step S63. In this way, as an example, an image display shown in FIG. 21 replaces the display of the aforementioned exemplary embodiment. That is, the rear-side image BI is displayed on the display unit 55D.

Figure 21:
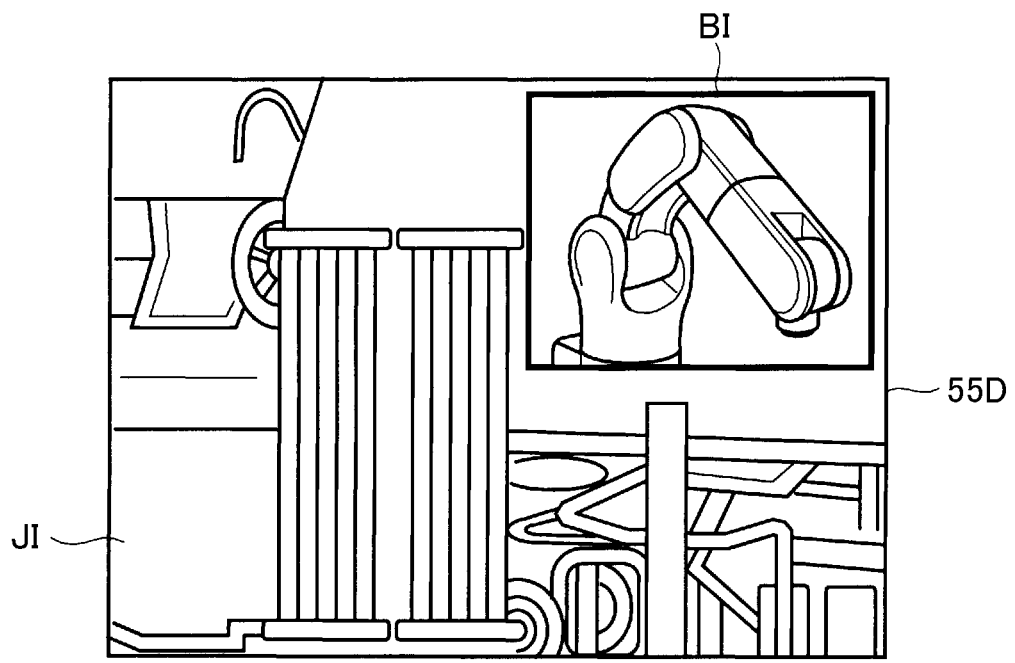
FIG. 21 is a drawing illustrating an example of worker's view to be seen through a display unit of a glasses-type monitor.

In this case, for example, the view that the worker 58 sees through the display 55D is in a state that an actual view JI seen through the display unit 55D becomes a background view as shown in FIG. 21 and 3D image data of the robot arm 52 displayed in a specific region section (a region excluding the display prohibition region) of the display unit 55D is overlapped with the background view. In this case, in order to see the 3D image data more easily, the image data is produced based on the processing in which a specific region around the robot arm 52 is processed as a non-transparent type so as to hide the aforementioned specific region.

As described above, the rear-side image may be displayed in the region excluding the display prohibition region like the aforementioned exemplary embodiment. That is, the rear-side image may be displayed together with the operation information or the only rear-side image BI itself may be displayed in the region excluding the display prohibition region. In the case in which the rear-side image BI is displayed in the region excluding the display prohibition region, the aforementioned processing of the step S9 may be inserted and additionally implemented.

According to the exemplary embodiment described above, the monitor controller 57 transmits an image signal and image data projected on the display unit 55D of the glasses-type monitor 55 mounted on the head of the worker 58. The camera 54 acquires the position information of the worker 58 within a working region of the robot arm 52. Furthermore, the annexed camera 56 outputs the image data as direction information so as to detect a head direction toward which the front-side of the head of the worker 58 within the working region faces. The robot controller 53 not only controls operation of the robot arm 52 but also maintains 3D model image data of the robot arm 52 based on three-dimensional modeling processing.

The monitor controller 57 acquires the 3D model image data according to the robot controller 53. In the case in which the worker 58 is positioned within the working region, and the head of the worker 58 faces toward the direction in which the robot arm 52 does not come into the view of the corresponding worker 58, when the 3D model image data of the robot arm 52 is input to the view of the worker 58 from the position of the worker 58, the robot arm 52 is processed to make itself a visible image and then is configured to be displayed on the display unit 55D.

According to the configuration described above, even in the case in which the worker 58 turns his or her back to the robot arm 52 such that the worker is in a position that he or her cannot directly see the robot arm 52, the 3D model image data of the robot arm 52 is projected on the glasses-type monitor 55 in a state that the robot arm 52 is observed when the worker 58 looks back or sideways at the robot arm 52 from the aforementioned position. That is, the 3D model image data is reflected and displayed like an image shown on a rear-view mirror or a side-view mirror while a vehicle is being driven. Consequently, the worker 58 confirms more realistic state of the robot arm 52 disposed at the rear-side or sideways of the worker 58 according to the 3D image displayed on the glasses-type monitor 55, thereby improving the level of safe working conditions.

Furthermore, as described in the aforementioned exemplary embodiment, the display information of the display unit is not limited to the operation information, and the rear-side information is able to be displayed such that the display information on the display unit can be more abundantly described.

In addition, the monitor controller 57 acquires the encoder value of the robot arm 52 according to the robot controller 53, and also processes the 3D model image data reflected on the glasses-type monitor 55 as posture image data depending on an encoder value at that time. According to the configuration described above, the worker 58 also recognizes the posture of the robot arm 52 at that time depending on the image displayed on the glasses-type monitor 55, thereby improving the level of safe working conditions.

Furthermore, when the monitor controller 57 requires a distance between the robot arm 52 and the worker 58 on the basis of the position information, the size of the 3D model image data reflected on the glasses-type monitor 55 is adjusted. According to the configuration described above, the worker 58 recognizes the distance from the robot arm 52 at that time depending the image displayed on the glasses-type monitor 55, thereby improving the level of safe working conditions.

Additionally, the monitor controller 57 detects a head direction of the worker 58 by processing an image captured by the annexed camera 56 disposed at the glasses-type monitor 55. That is, when the annexed camera 56 captures an image of a state in which the head of the worker 58 faces forward, it is determined whether the robot arm 52 is included within the view of the worker 58 or not according to the aforementioned image. Furthermore, when the monitor controller 57 processes the captured image, the head direction of the worker 58 is detected in a convenient way.

The present invention should not be limited to the exemplary embodiments specifically described and illustrated in the above various drawings, and are intended to cover various modifications and arrangements described hereinafter.

It is to be understood that the present invention is not limited to the disclosed drawings and embodiments, but, on the contrary, is intended to cover various modifications and equivalent arrangements described hereinafter.

Firstly, the robot monitoring system 51 may be additionally or independently implemented in the aforementioned exemplary embodiment.

Furthermore, the image data of the robot main body may be intended not only to produce a 3D model image but also to produce a two-dimensional image.

The robot main body is not limited to the robot arm 52. For example, the robot arm of the horizontal four axis constitution, the self-propelled robot, and the humanoid robot may be also included.

A laser sensor and infrared sensor may be provided to the position direction information acquisition unit.

When the image of the worker captured by the camera 54 is processed, the direction that the head of the worker faces is able to be detected. Therefore, a function as the direction information output unit may be provided to the camera 54, or a separate camera other than the camera 54 may be used as the direction information output unit. Furthermore, the image data may be directly input into the monitor controller 57.

A posture of the robot arm 52 is not necessarily required to be reflected to the 3D model image data displayed on the display unit 55D. In addition, the size of the image is not required to be adjusted depending on a distance, thus a fixed size thereof may be always displayed.

Each control device of the display and the robot may be composed as a singular control device. In this case, for example, "communication" may be performed inside the control device via a bus.

What is claimed is:

1. An information displaying system, comprising:
   a head-mounted type display provided with a transmission type display unit to be mounted on the head of a worker and configured to control an image to be displayed by projection on the transmission type display unit;
   a position direction information acquisition unit provided by a controller and configured to acquire information indicative of both a current position of the worker and a current eye-gaze direction of the worker;
   a calculation unit provided by the controller and configured to calculate a current display form of a production facility having a form that is changeable in the real world, the production facility coming into a view of the worker who visually sees the production facility in the real world through the transmission type display unit, based on both i) a position of the production facility and three-dimensional shape information of the production facility, and ii) the acquired information indicative of both the current position and the current eye-gaze direction of the worker;
   an operation information acquisition unit provided by the controller and configured to acquire operation information indicative of current operations of the production facility; and
   a display controller provided by the controller and configured to:
      i) set a current display prohibition region on the transmission type display unit, based on the calculated current display form of the production facility, the worker visually seeing, through the current display prohibition region, at least a portion of the production facility,
      ii) determine there is a space other than the current display prohibition region on the transmission type display unit, based on the calculated current display form of the production facility, the space providing a displayable region for display of the acquired operation information, the space being positionally changeable on the transmission type display unit depending on changes of the current operations of the production facility, iii) determine permit that the acquired operation information to be displayed in the displayable region on the transmission type display unit when it is determined that the space exists, and iv) display, as the image, the acquired operation information in the displayable region on the transmission type display unit.

2. The information displaying system according to claim 1, wherein the production facility includes an industrial robot provided with a robot arm, and the calculation unit is configured to acquire, as the current operations, current posture information of the robot arm, and change the current display form of the production facility depending on changes of the current posture of the robot arm.

3. The information displaying system according to claim 2, wherein the display controller is configured not to set the display prohibition region when the production facility remains away more than a fixed distance from the worker.

4. The information displaying system according to claim 2, wherein the display controller is configured to prohibit the operation information from being displayed when the current eye-gaze direction of the worker is inclined toward an inclination angle at more than a predetermined angle.

5. The information displaying system according to claim 2, wherein the display controller is configured to prohibit the display of the operation information when the displayable region of the operation information on the display unit becomes smaller than a fixed size due to the increase of the display prohibition region.

6. The information displaying system according to claim 2, wherein the display controller is configured to set, as the displayable region, a plurality of displayable regions depending on a position of the current display prohibition region, and display the operation information in the plurality of the displayable regions.

7. The information displaying system according to claim 2, wherein the calculation unit is configured to produce a position relationship between the worker and the production facility as image data, and the operation information acquisition unit is configured to include the image data in the operation information.

8. The information displaying system according to claim 1, wherein the display controller is configured to not set the display prohibition region when the production facility remains away more than a fixed distance from the worker.

9. The information displaying system according to claim 1, wherein the display controller is configured to prohibit the operation information from being displayed when the current eye-gaze direction of the worker is inclined toward an inclination angle at more than a predetermined angle.

10. The information displaying system according to claim 1, wherein the display controller is configured to prohibit the display of the operation information when the displayable region of the operation information on the display unit becomes smaller than a fixed size due to an increase of the display prohibition region.

11. The information displaying system according to claim 1, wherein the display controller is configured to set, as the displayable region, a plurality of displayable regions depending on a position of the current display prohibition region, and display the operation information in the plurality of the displayable regions.

12. The information displaying system according to claim 1, wherein the calculation unit is configured to produce a position relationship between the worker and the production facility as image data, and the operation information acquisition unit is configured to include the image data in the operation information to be displayed.

13. The information displaying system according to claim 1, wherein the production facility includes a robot arm of an industrial robot, and a direction information output unit to output direction information so as to detect a head direction toward which the front-side of the head of the worker, who is positioned within a working region of the robot arm, faces, wherein the display controller is configured to display, instead of the operation information, an image displaying an actual view shown when the robot arm comes into the view of the worker from the position of the worker with the operation information, in a state that a current head direction of the worker that is detected by the direction information faces toward a direction in which the robot arm does not come into a view of the worker in the region excluding the display prohibition region.

14. The information displaying system according to claim 13, further comprising:

a position direction information acquisition unit configured to acquire position information of the worker positioned within the working region of the robot arm, wherein the display controller includes:

a determination unit configured to determine whether the worker is in a state in which the worker is positioned within the working region, and a current head direction of the worker that is detected by the direction information is in a direction in which the robot arm does not come into a view of the worker or not;

an image processing unit configured to process image data of the robot arm as an image displaying an actual view when the robot arm comes into the view of the worker from the position of the worker, in a case in which the determination unit determines the state of the current head direction of the worker; and a display processing unit configured to project and display the image processed by the image processing unit on the display unit.

* * * * *